Aug. 8, 1933.　　　　H. B. SOULEN　　　　1,921,548

JUVENILE TIRING

Filed March 9, 1932

INVENTOR.

BY　HARRY B. SOULEN

Chapin & Neal
ATTORNEYS.

Patented Aug. 8, 1933

1,921,548

UNITED STATES PATENT OFFICE 1,921,548

JUVENILE TIRING

Harry B. Soulen, Milwaukee, Wis., assignor to Charles A. Dana and John B. Pierce, receivers for The Fisk Rubber Company, Chicopee Falls, Mass., a Corporation of Massachusetts Application March 9, 1932. Serial No. 597,686

7 Claims. (Cl. 152—1)

This invention relates to improvements in rubber tiring for juvenile vehicles such as scooters, miniature automobiles, wagons, baby carriages and the like.

It has for its object increased life, more efficient operation and greater facility in mounting such tires. Other and more specific objects will be apparent from the following specification and claims.

In the accompanying drawing which illustrates an embodiment of the invention,

Tiring of this character is customarily formed by extruding a suitable rubber compound through a die producing long lengths of the tiring, which is generally round in cross-section and provided with a small longitudinal opening to accommodate a wire or similar means by which the tire is held onto the wheel.

Tires of this character present several problems. Since the tiring is straight as it comes from the extruding die, its bending to fit the curvature of the wheel stretches the tread portion and compresses the inner periphery or base portion. There is a constant tendency for the tire to straighten itself and this tendency must be resisted by the wire which must be drawn very tight if the tire is to be kept on the wheel; in other words, the wire exerts a radial pressure on the underlying rubber sufficient to counteract the compression due to the bending of the tire which latter compression tends to cause the tire to leave the wheel in seeking to relieve itself of this bending compression. This has necessitated the placing of the wire somewhat above the center of the tire and the use of stiff stocks, to prevent the wire from cutting through the tire. This increased stiffness of the stock tends to increase the bending resistance. As a result this type of tiring is difficult to mount, particularly on wheels of small diameter, and difficult to keep in place, and their useful life is substantially less than the potential life of the stock from which they are made.

Figure 1:
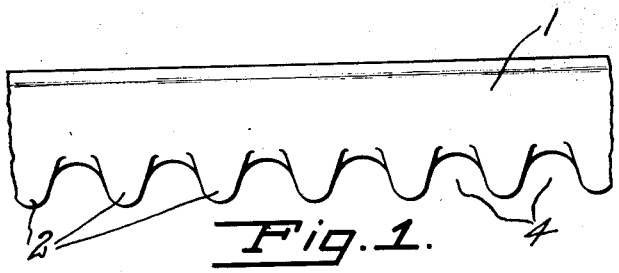
Fig. 1 is a side elevation of a fragment of the improved tiring.
Figure 2:
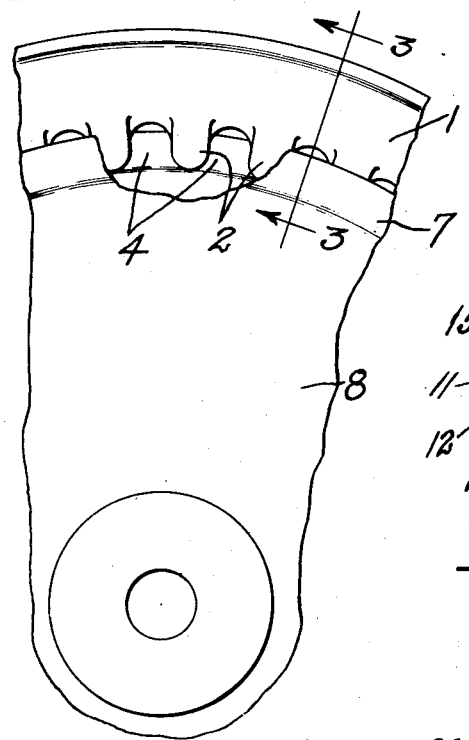
Fig. 2 is a fragmentary side view showing the tiring mounted on the wheel of a juvenile vehicle.
Figures 3, 6:
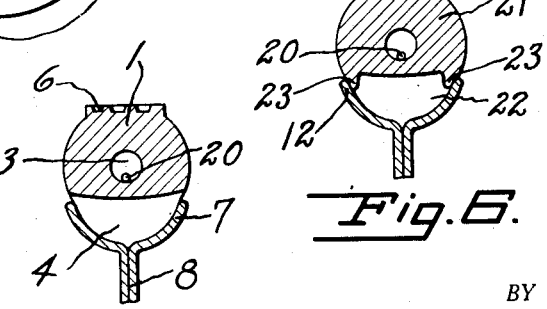
Fig. 3 is a section substantially on line 3—3 of Fig. 2.
Fig. 6 is a cross-sectional view showing still another modified form.

Referring to Figs. 1, 2 and 3, I propose to provide the tiring designated at 1 with transverse grooves, forming corrugations as at 2, as well as the customary wire receiving longitudinal opening 3. These corrugations are preferably formed as part of the extruding operation and are relatively narrow; that is, their longitudinal width is not sufficient to produce any abrupt change of curvature at the tread when the tiring is bent around the wheel. The spaces 4 between the corrugations 2 are at least equal in width to the corrugations and preferably somewhat wider. The surfaces of the corrugations and the intervening spaces are preferably curved. The tiring may be and preferably is provided with a tread design as indicated at 6, the flat tread surface cooperating with the flexibility of the base portion to stabilize the tire on the rim.

Figure 4:
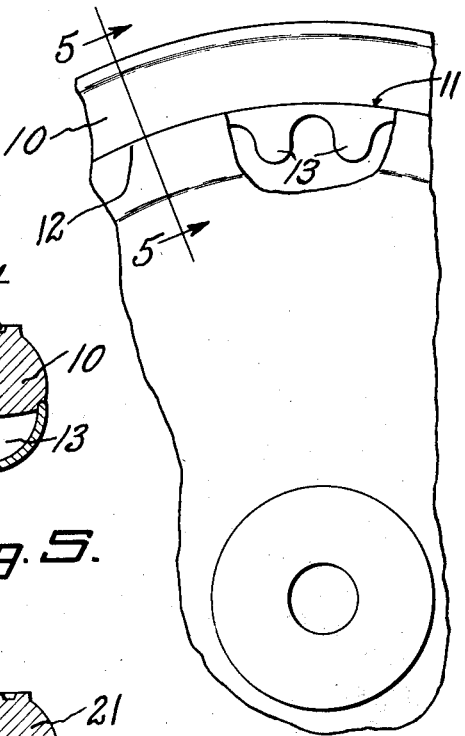
Fig. 4 is a view similar to Fig. 2 showing a modified form.
Figure 5:
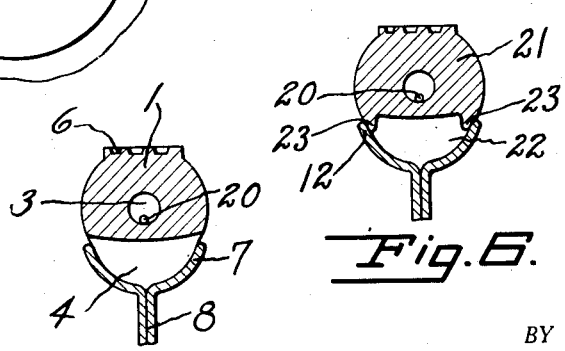
Fig. 5 is a cross-sectional view of the modified form on line 5—5 of Fig. 4.

In the form shown in Figs. 1, 2 and 3 the grooves between the corrugations are cut sufficiently deep as to extend above the rim 7 of the wheel 8 when the tire is mounted. This has the advantage that it adds somewhat to the resilience of the tire but in many cases it is preferable to keep the corrugations within the confines of the rim as shown in Figs. 4 and 5. As shown in the latter figures, the tire 10 is slightly under cut at the sides, forming seats 11 for the rim edges 12, the seats 11 being positioned at the base of the corrugations 13 so that the latter lie wholly within the rim as shown in Fig. 4. The tire 10 is provided with tread 14 and wire receiving opening 15 similar to the structure of the tire previously described.

A further modification is shown in Fig. 6, in which the spaces 22 between the corrugations extend upwardly into the body of the tiring 21 to a point above the rim edges 12 as in the first form described but the sidewalls of the tiring are extended below the rim edges as at 23 so that the sides of the openings are completely closed by the rim. This construction has the advantage of increased flexibility and resilience above the rim and at the same time prevents the entrance of foreign substance into the spaces 22.

I have found that in tires constructed according to my invention, the compression which tends to force the tire from the wheel is substantially eliminated and the retaining wire indicated at 20 in the drawing therefore has no tendency to cut through and destroy the tire. The tiring of my invention may be mounted on wheels of even very small diameter with surprising ease and remains in place without tendency to distortion or tendency to throw the tread out of line. Tires thus constructed give a length of service measured by the full life of the rubber above the wire opening rather than being cut short by the cutting of the wire through the base of the tire, and, furthermore, the amount of unused rubber between the wire and the rim is reduced to a minimum, thus decreasing the cost of the tire.

Having thus described my invention, I claim:

1. Tiring for juvenile vehicles and the like which comprises a straight length of rubber generally round in cross-section, provided along one side with relatively narrow transverse corrugations, the spaces between said corrugations having a width longitudinally of the tiring at least equal to the longitudinal width of the corrugations, the surfaces of the corrugations being curved, and a longitudinal wire receiving opening positioned centrally between the sidewalls of the tiring and slightly above the base of the corrugations.

2. Tiring for juvenile vehicles and the like which comprises a straight length of rubber generally round in cross-section, provided along one side with a tread surface and along the diametrically opposite side with relatively narrow transverse corrugations, the spaces between said corrugations having a width, longitudinally of the tiring, at least equal to the longitudinal width of the corrugations, the surfaces of the corrugations being curved, and a longitudinal wire receiving opening positioned centrally between the sidewalls of the tiring and slightly above the base of the corrugations.

3. Tiring for juvenile vehicles and the like which comprises a straight length of rubber, generally round in cross-section, provided along one side with a tread surface and along the diametrically opposite side with relatively narrow transverse corrugations, and a longitudinal wire receiving opening positioned intermediate the tread face and the base of the corrugations.

4. Tiring for juvenile vehicles and the like which comprises a straight length of rubber, generally round in cross-section, provided along one side with a tread surface and along the diametrically opposite side with relatively narrow transverse corrugations, the spaces between the corrugations having a width longitudinally of the tiring at least equal to the longitudinal width of the corrugations, and a longitudinal wire receiving opening positioned intermediate the tread face and the base of the corrugations.

5. Tiring for juvenile vehicles and the like which comprises a straight length of rubber generally round in cross-section, provided along one side with a tread surface and along the diametrically opposite side with relatively narrow transverse corrugations, the spaces between said corrugations having a width, longitudinally of the tiring, at least equal to the longitudinal width of the rubber intervening between the corrugations, and a depth slightly in excess of the depth of the rim on which the tire is to be placed, and a longitudinal wire receiving opening positioned centrally between the sidewalls of the tiring and slightly above the base of the corrugations.

6. Tiring for juvenile vehicles and the like which comprises a straight length of rubber generally round in cross-section, provided along one side with a tread surface and along the diametrically opposite side with transverse corrugations, the spaces between said corrugations having a width, longitudinally of the tiring, at least equal to the longitudinal width of the corrugations, and a depth slightly less than the depth of the rim on which the tire is to be placed, under cut shoulders formed along the sidewalls of the tiring adjacent the base of the corrugations to form a seat for the edges of the wheel rim, and a longitudinal wire receiving opening positioned centrally between the sidewalls of the tiring and slightly above the base of the corrugations.

7. A wheel tire comprising a generally cylindrical rubber structure formed on one side with a longitudinal series of chordal slots, the respective ends of said slots being partly obstructed by flanges formed in continuation of the side walls of the tire.

HARRY B. SOULEN.